United States Patent
Phui et al.

(10) Patent No.: US 10,443,438 B2
(45) Date of Patent: Oct. 15, 2019

(54) TURBOPUMP MACHINE WITH ISOLATED COOLING PASSAGE DISCHARGE

(71) Applicant: Aerojet Rocketdyne, Inc., Sacramento, CA (US)

(72) Inventors: Khin Phui, Pomona, CA (US); Thaddeus Chilcoat, Moorpark, CA (US)

(73) Assignee: AEROJET ROCKETDYNE, INC., Canoga Park, CA (US)

( * ) Notice: Subject to any disclaimer, the term of this patent is extended or adjusted under 35 U.S.C. 154(b) by 381 days.

(21) Appl. No.: 15/524,103

(22) PCT Filed: Nov. 5, 2015

(86) PCT No.: PCT/US2015/059173
§ 371 (c)(1),
(2) Date: May 3, 2017

(87) PCT Pub. No.: WO2016/118208
PCT Pub. Date: Jul. 28, 2016

(65) Prior Publication Data
US 2018/0313228 A1 Nov. 1, 2018

Related U.S. Application Data

(60) Provisional application No. 62/078,894, filed on Nov. 12, 2014.

(51) Int. Cl.
F01D 25/12 (2006.01)
F04D 29/046 (2006.01)
(Continued)

(52) U.S. Cl.
CPC .......... *F01D 25/125* (2013.01); *F01D 25/16* (2013.01); *F01D 25/183* (2013.01); *F02K 9/48* (2013.01);
(Continued)

(58) Field of Classification Search
CPC ...... F01D 25/125; F01D 25/16; F01D 25/183; F04D 29/04; F04D 29/05; F04D 29/046;
(Continued)

(56) References Cited

U.S. PATENT DOCUMENTS 3,734,649 A * 5/1973 Sandy, Jr. ............... F04D 13/04
417/370
5,197,851 A 3/1993 Girault
7,828,511 B1 11/2010 Pinera et al.

FOREIGN PATENT DOCUMENTS

RU 2106534 3/1998

OTHER PUBLICATIONS

The International Preliminary Report on Patentability for PCT Application No. PCT/US2015/059173, dated May 26, 2017.
(Continued)

*Primary Examiner* — Richard A Edgar
(74) *Attorney, Agent, or Firm* — Joel G Landau

(57) ABSTRACT

A turbopump machine includes a housing, a shaft rotatably supported in the housing on a set of bearings, an axial pump coupled with the shaft, a circumferential discharge volute fluidly coupled with the axial pump, and a turbine coupled with the shaft. The turbine includes a blade row disposed in an axial turbine flowpath that has an axial turbine flowpath discharge that is fluidly coupled with the circumferential discharge volute. A cooling passage is disposed between the housing and the shaft about the set of bearings. The cooling passage has a cooling passage discharge that is fluidly coupled with the circumferential discharge volute. The cooling passage discharge is adjacent the axial turbine flowpath discharge. A seal isolates the cooling passage discharge from the axial turbine flowpath discharge.

20 Claims, 4 Drawing Sheets

(51) Int. Cl.
*F04D 29/42* (2006.01)
*F02K 9/48* (2006.01)
*F04D 13/04* (2006.01)
*F04D 29/08* (2006.01)
*F04D 29/52* (2006.01)
*F04D 29/58* (2006.01)
*F01D 25/16* (2006.01)
*F01D 25/18* (2006.01)

(52) U.S. Cl.
CPC ......... *F04D 13/043* (2013.01); *F04D 29/046* (2013.01); *F04D 29/086* (2013.01); *F04D 29/4293* (2013.01); *F04D 29/522* (2013.01); *F04D 29/586* (2013.01); *F05D 2250/52* (2013.01); *F05D 2260/232* (2013.01)

(58) Field of Classification Search
CPC .. F04D 29/086; F04D 29/4293; F04D 29/522; F04D 29/586; F04D 13/043; F02K 9/48; F05D 2250/52; F05D 2260/232
See application file for complete search history.

(56) References Cited

OTHER PUBLICATIONS

International Search Report and Written Opinion for International Application No. PCT/US2015/059173 dated Aug. 3, 2016.

* cited by examiner

TURBOPUMP MACHINE WITH ISOLATED COOLING PASSAGE DISCHARGE

CROSS-REFERENCE TO RELATED APPLICATIONS

The present disclosure claims priority to U.S. Provisional Patent Application No. 62/078,894, filed Nov. 12, 2014.

BACKGROUND

A turbopump may be used in a rocket engine system to pump a liquid propellant, such as liquid oxidizer. Such a turbopump can include a pump section and a turbine section mounted on a common shaft. The turbine section is driven by expansion of a working fluid, such as a hot gas in the system. The turbine section drives the pump section, which pressurizes the liquid propellant for delivery to a combustor or other downstream component in the engine system.

SUMMARY

A turbopump machine according to an example of the present disclosure includes a housing, a shaft rotatably supported in the housing on a set of bearings, an axial pump coupled with the shaft, a circumferential discharge volute fluidly coupled with the axial pump, and a turbine coupled with the shaft. The turbine includes a blade row disposed in an axial turbine flowpath that has an axial turbine flowpath discharge that is fluidly coupled with the circumferential discharge volute. A cooling passage is disposed between the housing and the shaft about the set of bearings. The cooling passage has a cooling passage discharge fluidly coupled with the circumferential discharge volute. The cooling passage discharge is adjacent the axial turbine flowpath discharge. A seal isolates the cooling passage discharge from the axial turbine flowpath discharge.

In a further embodiment of any of the forgoing embodiments, the seal is selected from the group consisting of a labyrinth seal, a clearance seal, a seal ring, and a damper seal.

In a further embodiment of any of the forgoing embodiments, the axial pump includes an axial pump discharge that opens into the circumferential discharge volute, and the cooling passage includes an inlet that opens at the axial pump discharge.

In a further embodiment of any of the forgoing embodiments, the cooling passage includes a retrograde section extending forward from the inlet toward the axial pump.

In a further embodiment of any of the forgoing embodiments, the retrograde section includes a vane.

In a further embodiment of any of the forgoing embodiments, the turbine includes a turbine disk with an axial face having radial pump elements across which a portion of the cooling passage extends.

In a further embodiment of any of the forgoing embodiments, the radial pump elements include fins.

In a further embodiment of any of the forgoing embodiments, the cooling passage discharge includes a flow restrictor.

In a further embodiment of any of the forgoing embodiments, the flow restrictor includes a raised edge that narrows the cooling passage.

In a further embodiment of any of the forgoing embodiments, the cooling passage discharge is radially inboard of the axial turbine flowpath discharge.

A turbopump machine according to an example of the present disclosure includes a housing, a shaft rotatably supported in the housing on a set of bearings, a circumferential discharge volute, an axial pump coupled with the shaft and including an axial pump discharge that is fluidly coupled with the circumferential discharge volute, and a turbine coupled with the shaft. The turbine includes a turbine disk that has an axial face with radial pump elements and a blade row that is disposed in an axial turbine flowpath. The axial turbine flowpath has an axial turbine flowpath discharge that is fluidly coupled with the circumferential discharge volute. A cooling passage has an inlet that opens at the axial pump discharge, a first intermediate section that is disposed between the housing and the shaft about the set of bearings, a second intermediate section that extends across the radial pump elements of the turbine, and a cooling passage discharge that opens at the circumferential discharge volute adjacent the axial turbine flowpath discharge.

In a further embodiment of any of the forgoing embodiments, the cooling passage includes a retrograde section extending forward from the inlet toward the axial pump to the first intermediate section.

In a further embodiment of any of the forgoing embodiments, the retrograde section includes a vane.

In a further embodiment of any of the forgoing embodiments, the radial pump elements include fins.

In a further embodiment of any of the forgoing embodiments, rein the fins are radially elongated ribs.

A further embodiment of any of the foregoing embodiments includes a seal isolating the cooling passage discharge from the axial turbine flowpath discharge.

In a further embodiment of any of the forgoing embodiments, the cooling passage discharge is radially inboard of the axial turbine flowpath discharge.

A process of operating a turbopump machine according to an example of the present disclosure includes discharging a gas from a turbine that is coupled with a shaft. The gas is discharged through an axial turbine flowpath and into a circumferential discharge volute. A liquid oxidizer is discharged from an axial pump that is coupled with the shaft. The liquid oxidizer is discharged into the circumferential discharge volute. The gas in the circumferential discharge volute is condensed using the liquid oxidizer in the circumferential discharge volute. A portion of the liquid oxidizer is bled at a location upstream from the circumferential discharge volute into a cooling passage that is disposed between a housing and the shaft about a set of bearings upon which the shaft is rotatably supported. The portion of the liquid oxidizer is discharged from the cooling passage into the circumferential discharge volute through a cooling passage discharge that is adjacent the axial turbine flowpath discharge. The portion of the liquid oxidizer in the cooling passage discharge is inhibited from condensing the gas in the axial turbine flowpath discharge by isolating the cooling passage discharge from the axial turbine flowpath discharge.

In a further embodiment of any of the forgoing embodiments, the isolating of the cooling passage discharge from the axial turbine flowpath discharge includes sealing the cooling passage discharge from the axial turbine flowpath discharge.

A further embodiment of any of the foregoing embodiments includes urging flow of the portion of the liquid oxidizer through the cooling passage using radial pump elements on a turbine disk of the turbine.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1A:
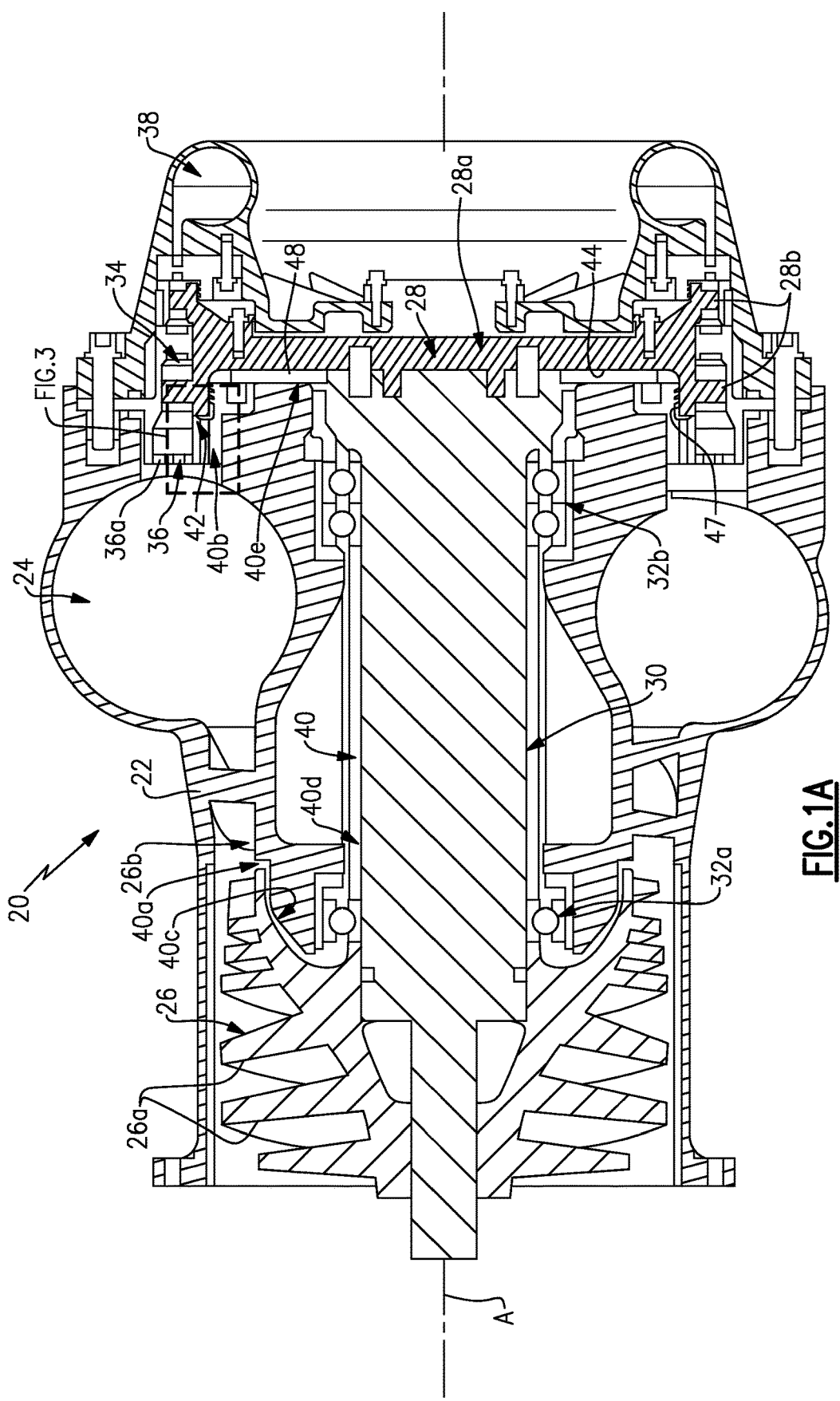
FIG. 1A illustrates an example turbopump machine with a seal that isolates a cooling passage discharge from an axial turbine flowpath discharge.

FIG. 1A schematically illustrates a turbopump machine 20 that can be used in, but is not limited to, a rocket engine system. As will be described, the turbopump machine 20 includes features for enhanced cooling and/or lubrication, while limiting condensation build-up in areas where it could hinder operation.

The turbopump machine 20 includes a housing 22, a circumferential discharge volute 24, an axial pump 26, and a turbine 28. The housing 22 may include or define the geometry of the circumferential discharge volute 24. The axial pump 26 and the turbine 28 are coupled for co-rotation on a common shaft 30. The shaft 30 is mounted on a set of bearings 32a/32b. In this example, the bearings 32a are forward or leading end bearings and the bearings 32b are aft or trailing end bearings.

The axial pump 26 includes a plurality of rows of impeller blades 26a and an axial pump discharge 26b that opens into the circumferential discharge volute 24. The impeller blades 26a serve to pressurize and move a fluid, such as liquid oxidizer, into the circumferential discharge volute 24. Ultimately, the liquid oxidizer may be delivered to a combustor or other downstream component.

The turbine 28 includes a turbine disk 28a and one or more rows of turbine blades 28b. In the illustrated example, the turbine 28 includes two rows of turbine blades 28b. The row or rows of turbine blades 28b are disposed in an axial turbine flowpath 34 that has an axial turbine flowpath discharge 36 that opens into and is fluidly coupled with the circumferential discharge volute 24. A turbine inlet 38 is fluidly coupled with the axial turbine flowpath 34. The turbine inlet 38 serves to feed the hot pressurized gas across the turbine blades 28b.

In this example, the axial turbine flowpath discharge 36 includes a showerhead type outlet 36a that has a plurality of orifices that serve to break-up hot pressurized gas flow discharged through the axial turbine flowpath discharge 36. Other types or geometries of outlets could alternatively be used in place of the showerhead outlet 36a.

The turbopump machine 20 utilizes the liquid oxidizer as an internal coolant and/or lubricant. In this regard, the turbopump machine 20 includes a cooling passage 40 disposed between the housing 22 and the shaft 30 about the set of bearings 32a/32b. The cooling passage 40 extends from an inlet 40a that opens at the axial pump discharge 26b to a cooling passage discharge 40b that opens into and is fluidly coupled with the circumferential discharge volute 24.

The cooling passage discharge 40b is adjacent the axial turbine flowpath discharge 36. In this example, the cooling passage discharge 40b is radially inboard of the axial turbine flowpath discharge 36, with respect to a central rotational axis "A" of the turbopump machine 20. There is a seal 42 between the cooling passage discharge 40b (static) and a rotating portion of the axial turbine flowpath discharge 36 (i.e., a rim 47 of the turbine disk 28a). The seal 42 isolates the cooling passage discharge 40b from the axial turbine flowpath discharge 36, the effects of which are described in further detail below.

The cooling passage 40 generally includes several sections between the inlet 40a and the cooling passage discharge 40b. Serially from the inlet 40a the cooling passage 40 includes a retrograde section 40c, a first intermediate section 40d, and a second intermediate section 40e. The retrograde section 40c slopes forward from the inlet 40a toward the axial pump 26 to the first intermediate section 40d. The first intermediate section 40d extends across the leading end bearing 32a, axially along the shaft 30, and across the trailing end bearing 32b. The second intermediate section 40e extends radially outwardly from the first intermediate section 40d and along the turbine disk 28a to the cooling passage discharge 40b.

Figure 1B:
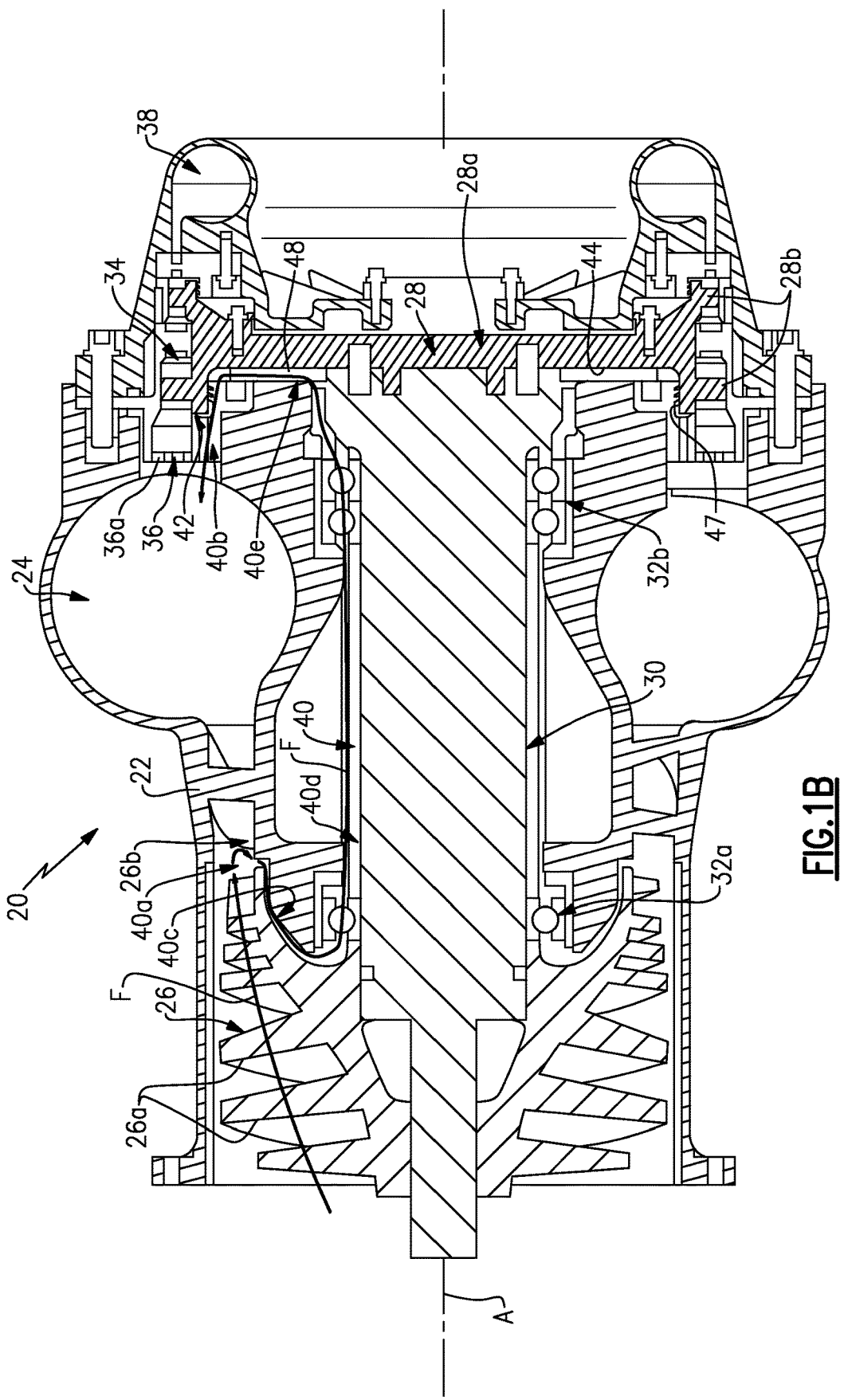
FIG. 1B shows a cooling flowpath through the turbopump machine of FIG. 1A.

The flow through the cooling passage 40 is shown at "F" in FIG. 1B. During operation the turbopump machine 20 receives liquid oxidizer (from the left in FIG. 1A) into the axial pump 26. The axial pump 26 pressurizes and moves the liquid oxidizer through the axial pump discharge 26b and into the circumferential discharge volute 24. A portion of the pressurized liquid oxidizer bleeds through the inlet 40a into the retrograde section 40c of the cooling passage 40. The liquid oxidizer bleed portion then flows through the first intermediate section 40d over the bearings 32a/32b to cool and/or lubricate the bearings 32a/32b. The liquid oxidizer bleed portion then flows through the second intermediate section 40e along the turbine 28 and then axially forward through the cooling passage discharge 40b into the circumferential discharge volute 24.

The turbine 28 receives a hot pressurized gas into the turbine inlet 38. The turbine inlet 38 may be connected to a hot pressurized gas source, such as a rocket engine system pre-burner or gas generator. The hot pressurized gas may contain oxygen, carbon dioxide, hydrogen, or mixtures thereof. The turbine inlet 38 feeds the hot pressurized gas for expansion across the turbine blades 28b, which causes rotation of the shaft 30 to drive the axial pump 26. The expanded hot pressurized gas flows axially through the axial turbine flowpath discharge 36 and into the circumferential discharge volute 24, where it mixes with the liquid oxidizer and may condense.

The separate, isolated arrangement provided by the seal 42 between the axial turbine flowpath discharge 36 and the cooling passage discharge 40b prevents or limits premature mixing of the liquid oxidizer and the hot pressurized gas in or near the cooling passage discharge 40b. In other words, the liquid oxidizer and hot pressurized gas mix only in the circumferential discharge volute 24. For example, if the hot pressurized gas were to instead be mixed with the liquid oxidizer prior to discharge into the circumferential discharge volute 24, the gas could condense into ice and build-up in or around the cooling passage 40. The ice build-up could potentially restrict flow through the cooling passage 40 and/or axial turbine flowpath discharge 36. Such a flow restriction might otherwise cause over-heating and damage to a turbopump.

Figure 2:
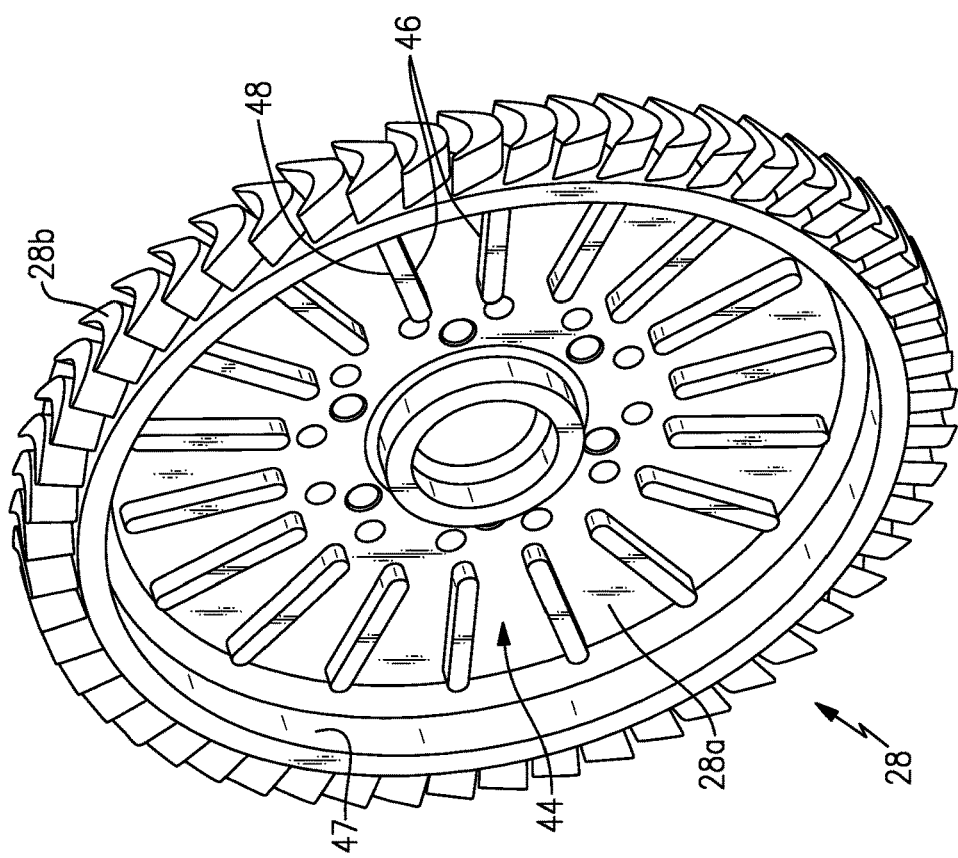
FIG. 2 illustrates an isolated view of a portion of a turbine with radial pump elements.

FIG. 2 illustrates an isolated view of a portion of the turbine 28. The turbine disk 28a includes an axial face 44. The axial face 44 is oriented in the turbopump machine 20 toward the axial pump 26 such that the second intermediate section 40e of the cooling passage 40 extends across the axial face 44. The axial face 44 includes radial pump elements 46 and an axially protruding rim 47. In this example, the radial pump elements 46 include fins in the form of radially elongated ribs 48. The radially elongated ribs 48 are circumferentially-spaced around the axial face 44. The radially elongated ribs 48 are linear as shown; however, the radially elongated ribs 48 alternatively could be curved or could have another fluid-dynamic geometry for pumping.

The radial pump elements 46 are situated in the second intermediate section 40e of the cooling passage 40. As the turbine 28 rotates, the radial pump elements 46 rotate and provide an active pumping action that assists flow of the liquid oxidizer through the cooling passage 40. The pumping action keeps liquid oxidizer constantly and consistently moving across the bearings 32a/32b, which facilitates good cooling and/or lubrication of the bearings 32a/32b. The axially protruding rim 47 receives the flow of liquid oxidizer from the radially elongated ribs 48 and turns or directs the flow forward and into the cooling passage discharge 40b.

The constant and consistent flow of liquid oxidizer through the cooling passage 40 prevents or limits back flow of hot pressurized gas through the cooling passage discharge 40b into the cooling passage 40. Such back flow might otherwise increase the potential for the hot pressurized gas to condense and build-up in the cooling passage 40.

Figure 3A:
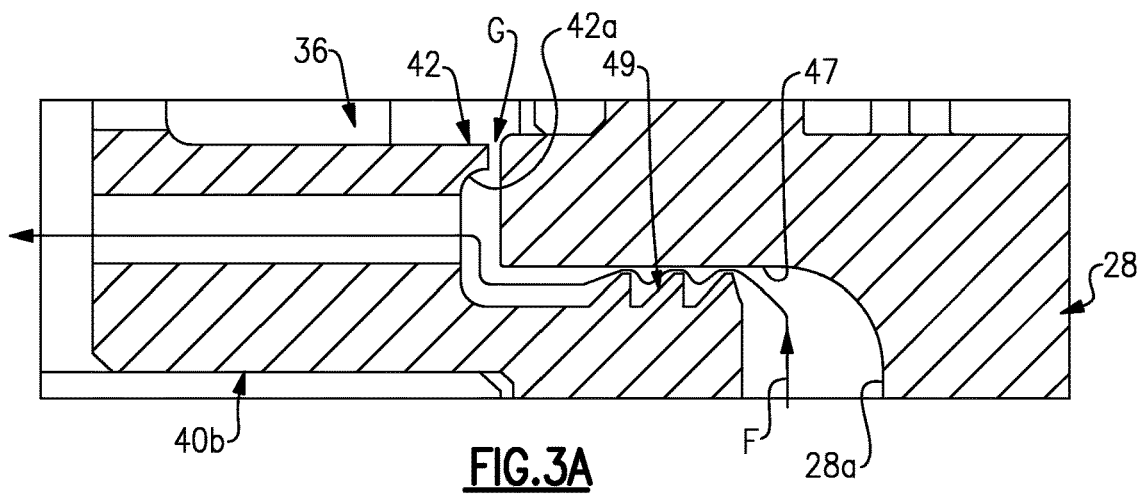
FIG. 3A illustrates a magnified view of a seal between a cooling passage discharge and an axial turbine flowpath discharge.

FIG. 3A illustrates a magnified view near the cooling passage discharge 40b and seal 42. In this example, the cooling passage discharge 40b includes one or more flow restrictors 49 that serve to regulate flow through the cooling passage discharge 40b. As shown, the flow restrictor or restrictors 49 are raised edges that narrow the cooling passage 40. In this example, the raised edges are located on the non-rotatable (stator) portion of the turbopump machine 20; however, it is to be understood that the raised edges could alternatively or additionally be located in the rotatable portion (rotor).

The depicted seal 42 is a clearance type seal that includes a tapered ridge 42a with a controlled clearance gap, G, with the rim 47 of the turbine 28. Generally, the clearance gap G is tightly controlled to prevent or substantially limit infiltration of the hot pressurized gas from the axial turbine flowpath discharge 36 (shown in part in FIG. 3A) into the cooling passage discharge 40b and cooling passage 40.

Figure 3B:
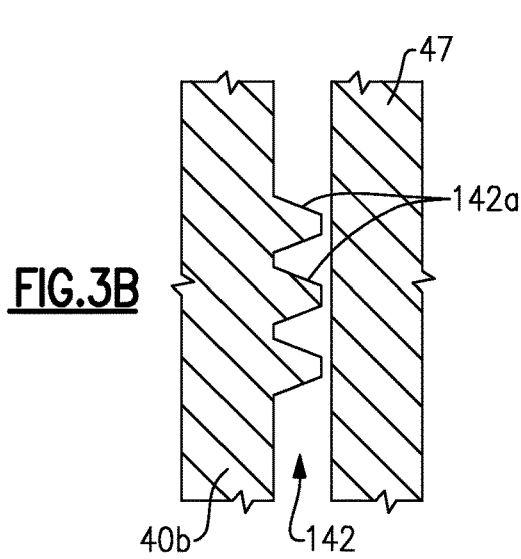
FIG. 3B illustrates an example labyrinth seal.

Alternatively, FIG. 3B illustrates another example seal 142. In this example, the seal 142 is a labyrinth seal that includes a plurality of raised edges 142a. The raised edges 142a are shown as being located on the cooling passage discharge 40b (stator). However, it is to be understood that the raised edges 142a could alternatively be on the rim 47 (rotor).

Figure 3C:
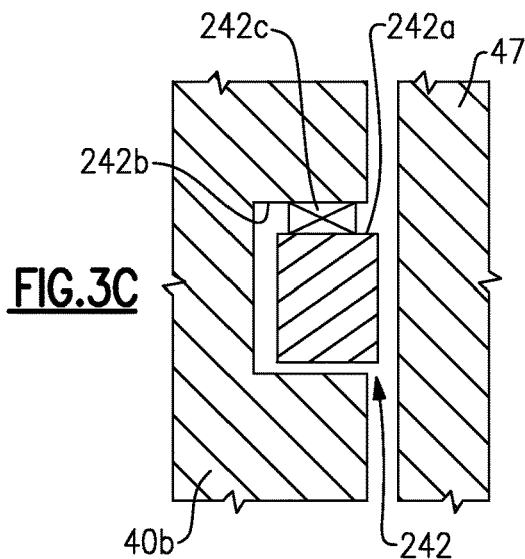
FIG. 3C illustrates an example seal ring.

FIG. 3C illustrates another example seal 242. In this example, the seal 242 is a floating ring seal that includes a seal ring 242a that partially protrudes from a circumferential pocket 242b in the cooling passage discharge 40b. Optionally, a spring member 242c biases the seal ring 242a in the pocket 242b. The seal ring 242a can move, or "float," relative to the pocket 242b but is retained in the pocket 242b due to the close proximity of the rim 47. The seal ring 242a and pocket 242b are shown as being located in the cooling passage discharge 40b (stator). However, it is to be understood that the seal ring 242a and pocket 242b could alternatively be in the rim 47 (rotor).

Figure 3D:
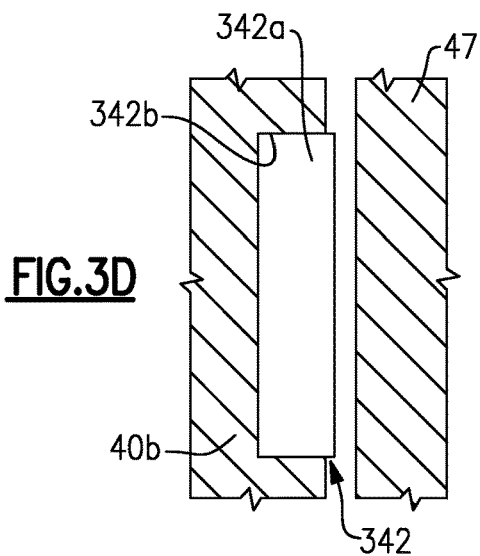
FIG. 3D illustrates an example damper seal.

FIG. 3D illustrates another example seal 342. In this example, the seal 342 is a damper seal that includes a damper ring 342a that partially protrudes from a circumferential pocket 342b in the cooling passage discharge 40b. The damper ring 342a may be secured in the pocket 242b by friction-fit, fastener, or the like. The damper ring 342a and pocket 342b are shown as being located in the cooling passage discharge 40b (stator). However, it is to be understood that the damper ring 342a and pocket 342b could alternatively be in the rim 47 (rotor). In further examples, the flow restrictor 49 could include a seal that is configured the same or similar to any of the seals 42/142/242/342. As can be appreciated, these or other types of seals may be used to isolate the cooling passage discharge 40b and cooling passage 40 from the axial turbine flowpath discharge 36.

Although the turbopump machine 20 is shown and described with certain features herein, it is to be appreciated that modified embodiments may not include all of the described features. For instance, in further non-limiting examples, the sections or geometry of the cooling passage 40 may be varied, such as to eliminate the retrograde section 40c. Additionally or alternatively, further embodiments may exclude the radial pump elements 46. Additionally or alternatively, further embodiments may exclude the flow restrictors 49, utilize different or additional flow restrictors, and/or utilize a different type of seal to isolate the cooling passage discharge 40b from the axial turbine flowpath discharge 36. Although such features enhance performance, these features could potentially be excluded or modified where changes in performance are acceptable.

Figure 4:
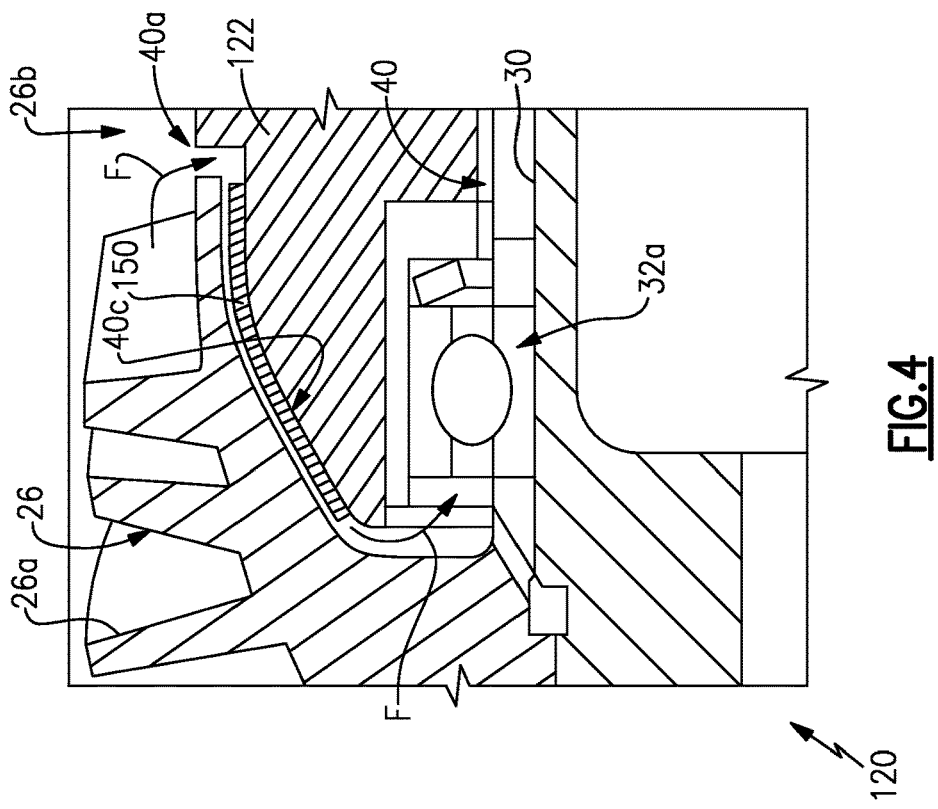
FIG. 4 illustrates a portion of a turbopump machine with vanes in a cooling passage.

FIG. 4 illustrates a portion of another example turbopump machine 120. The portion shown is near the axial pump 26 and axial pump discharge 26b. In this example, the housing 122 includes a plurality of vanes 150 (one shown) in the retrograde section 40c of the cooling passage 40. The vanes 150 protrude from the primary surface of the housing 122 and generally have a small clearance gap with the inside surface of the axial pump 26. The vanes 150 may be used instead of or in addition to the radial pump elements 46 on the turbine disk 28a, to assist flow of the liquid oxidizer through the cooling passage 40. Similar to the radially elongated ribs 48, the vanes 150 can be circumferentially-spaced elongated ribs, and can have a linear, curved, or other fluid-dynamic geometry.

The liquid oxidizer that enters through the opening 40a may have a swirling, turbulent flow profile due to the rotational influence of the axial pump 26. Such a flow profile can increase pressure fluctuations and pressure differentials in the liquid oxidizer. This in turn may increase the potential for hot pressurized gas to back flow into the cooling passage 40 where it could build-up as ice. The vanes 150 serve to smooth the flow of liquid oxidizer, reduce pressure fluctuations, and reduce pressure differentials to thus reduce the potential for back flow of the hot pressurized gas. Additionally or alternatively, such vanes could be provided in the first intermediate section 40d of the cooling passage 40, although the vanes 150 may be more effective in locations closer to the opening 40a.

The examples herein also encompass a process of operating a turbopump machine. The process can be described with regard to the turbopump machine 30. Such a process can include discharging the hot pressurized gas from the turbine 28, through the axial turbine flowpath, and into the circumferential discharge volute 24. The process further includes discharging the liquid oxidizer from the axial pump 26 into the circumferential discharge volute 24. The liquid oxidizer in the circumferential discharge volute 24 condenses the hot pressurized gas in the circumferential discharge volute 24. A portion of the liquid oxidizer is bled at a location upstream from the circumferential discharge volute 24 into the cooling passage 40. The bleed liquid oxidizer is discharged from through the cooling passage discharge 40b into the circumferential discharge volute 24. The cooling passage discharge 40b is isolated from the axial turbine flowpath discharge 36, thus inhibiting the bleed liquid oxidizer from condensing the pressurized hot gas in and around the axial turbine flowpath discharge 36. The process can further include urging the flow of the bleed liquid oxidizer through the cooling passage 40 using the radial pump elements 46 on the turbine disk 28a.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A turbopump machine comprising:
a housing;
a shaft rotatably supported in the housing on a set of bearings;
an axial pump coupled with the shaft;
a circumferential discharge volute fluidly coupled with the axial pump;
a turbine coupled with the shaft, the turbine including a blade row disposed in an axial turbine flowpath having an axial turbine flowpath discharge that is fluidly coupled with the circumferential discharge volute;
a cooling passage disposed between the housing and the shaft about the set of bearings, the cooling passage having a cooling passage discharge fluidly coupled with the circumferential discharge volute, wherein the cooling passage discharge is adjacent the axial turbine flowpath discharge; and
a seal isolating the cooling passage discharge from the axial turbine flowpath discharge.

2. The turbopump machine as recited in claim 1, wherein the seal is selected from the group consisting of a labyrinth seal, a clearance seal, a seal ring, and a damper seal.

3. The turbopump machine as recited in claim 1, wherein the axial pump includes an axial pump discharge that opens into the circumferential discharge volute, and the cooling passage includes an inlet that opens at the axial pump discharge.

4. The turbopump machine as recited in claim 3, wherein the cooling passage includes a retrograde section extending forward from the inlet toward the axial pump.

5. The turbopump machine as recited in claim 4, wherein the retrograde section includes a vane.

6. The turbopump machine as recited in claim 1, wherein the turbine includes a turbine disk with an axial face having radial pump elements across which a portion of the cooling passage extends.

7. The turbopump machine as recited in claim 6, wherein the radial pump elements include fins.

8. The turbopump machine as recited in claim 1, wherein the cooling passage discharge includes a flow restrictor.

9. The turbopump machine as recited in claim 8, wherein the flow restrictor includes a raised edge that narrows the cooling passage.

10. The turbopump machine as recited in claim 1, wherein the cooling passage discharge is radially inboard of the axial turbine flowpath discharge.

11. A turbopump machine comprising:
a housing;
a shaft rotatably supported in the housing on a set of bearings;
a circumferential discharge volute;
an axial pump coupled with the shaft and including an axial pump discharge that is fluidly coupled with the circumferential discharge volute;
a turbine coupled with the shaft, the turbine including a turbine disk comprising,
an axial face having radial pump elements, and
a blade row disposed in an axial turbine flowpath having an axial turbine flowpath discharge that is fluidly coupled with the circumferential discharge volute; and
a cooling passage having an inlet that opens at the axial pump discharge, a first intermediate section disposed between the housing and the shaft about the set of bearings, a second intermediate section extending across the radial pump elements of the turbine, and a cooling passage discharge that opens at the circumferential discharge volute adjacent the axial turbine flowpath discharge.

12. The turbopump machine as recited in claim 11, wherein the cooling passage includes a retrograde section extending forward from the inlet toward the axial pump to the first intermediate section.

13. The turbopump machine as recited in claim 12, wherein the retrograde section includes a vane.

14. The turbopump machine as recited in claim 11, wherein the radial pump elements include fins.

15. The turbopump machine as recited in claim 14, wherein the fins are radially elongated ribs.

16. The turbopump machine as recited in claim 11, further comprising a seal isolating the cooling passage discharge from the axial turbine flowpath discharge.

17. The turbopump machine as recited in claim 11, wherein the cooling passage discharge is radially inboard of the axial turbine flowpath discharge.

18. A process of operating a turbopump machine, the process comprising:
discharging a gas from a turbine that is coupled with a shaft, the gas being discharged through an axial turbine flowpath and into a circumferential discharge volute;
discharging a liquid oxidizer from an axial pump that is coupled with the shaft, the liquid oxidizer being discharged into the circumferential discharge volute;
condensing the gas in the circumferential discharge volute using the liquid oxidizer in the circumferential discharge volute;
bleeding a portion of the liquid oxidizer at a location upstream from the circumferential discharge volute into a cooling passage that is disposed between a housing and the shaft about a set of bearings upon which the shaft is rotatably supported, and discharging the portion of the liquid oxidizer from the cooling passage into the circumferential discharge volute through a cooling passage discharge that is adjacent the axial turbine flowpath discharge; and inhibiting the portion of the liquid oxidizer in the cooling passage discharge from condensing the gas in the axial turbine flowpath discharge by isolating the cooling passage discharge from the axial turbine flowpath discharge.

19. The process as recited in claim 18, wherein the isolating of the cooling passage discharge from the axial turbine flowpath discharge includes sealing the cooling passage discharge from the axial turbine flowpath discharge.

20. The process as recited in claim 18, further comprising urging flow of the portion of the liquid oxidizer through the cooling passage using radial pump elements on a turbine disk of the turbine.

* * * * *